(12) United States Patent
Kennedy, Jr. et al.

(10) Patent No.: US 7,945,212 B2
(45) Date of Patent: May 17, 2011

(54) NETWORK OVERLAY GEO-LOCATION SYSTEM WITH SMART ANTENNAS AND METHOD OF OPERATION

(75) Inventors: Joseph P. Kennedy, Jr., Great Falls, VA (US); Thomas B. Gravely, Herndon, VA (US); Andrew E. Beck, Ashburn, VA (US); John P. Carlson, Dulles, VA (US)

(73) Assignee: Andrew, LLC, Hickory, NC (US)

( * ) Notice: Subject to any disclaimer, the term of this patent is extended or adjusted under 35 U.S.C. 154(b) by 1165 days.

(21) Appl. No.: 10/531,040

(22) PCT Filed: Oct. 16, 2003

(86) PCT No.: PCT/US03/32578
§ 371 (c)(1),
(2), (4) Date: Jan. 8, 2007

(87) PCT Pub. No.: WO2004/036934
PCT Pub. Date: Apr. 29, 2004

(65) Prior Publication Data
US 2010/0178929 A1    Jul. 15, 2010

Related U.S. Application Data

(60) Provisional application No. 60/418,342, filed on Oct. 16, 2002.

(51) Int. Cl.
*H04B 17/00* (2006.01)
*H04W 72/00* (2009.01)
*H04W 24/00* (2009.01)

(52) U.S. Cl. .................. 455/67.11; 455/451; 455/456.1; 455/456.2; 455/456.5

(58) Field of Classification Search .............. 455/67.11, 455/451, 456.1, 456.5, 456.2; 375/133; 342/451
See application file for complete search history.

(56) References Cited

U.S. PATENT DOCUMENTS

| | | | |
|---|---|---|---|
| 4,783,744 | A | 11/1988 | Yueh |
| 5,317,323 | A | 5/1994 | Kennedy, Jr. et al. |
| 5,465,289 | A | 11/1995 | Kennedy, Jr. et al. |
| 5,506,863 | A | 4/1996 | Meidan |
| 5,870,029 | A | 2/1999 | Otto et al. |
| 6,144,711 | A | 11/2000 | Raleigh et al. |
| 6,188,351 | B1 | 2/2001 | Bloebaum |
| 6,212,391 | B1 | 4/2001 | Saleh et al. |
| 6,295,455 | B1 | 9/2001 | Fischer et al. |
| 6,311,043 | B1 | 10/2001 | Haardt et al. |

(Continued)

FOREIGN PATENT DOCUMENTS

JP  60-347529  12/1994

OTHER PUBLICATIONS

Leshem, et al., "Array Calibration in the Presence of Multipath," IEEE Transactions of Signal Processing, vol. 48, No. 1, pp. 53-59, Jan. 1, 2000.

(Continued)

*Primary Examiner* — William D Cumming
(74) *Attorney, Agent, or Firm* — Duane Morris, LLP

(57) ABSTRACT

A system and method in a wireless communication system having plural base stations (10a, 10b, 10c) and a MSC (45) with a network overlay geo-location system.

51 Claims, 16 Drawing Sheets

U.S. PATENT DOCUMENTS

| | | | |
|---|---|---|---|
| 6,334,059 | B1 | 12/2001 | Stilp et al. |
| 6,470,195 | B1 | 10/2002 | Meyer |
| 6,477,161 | B1 | 11/2002 | Hudson et al. |
| 6,501,955 | B1 | 12/2002 | Durrant et al. |
| 6,553,322 | B1 | 4/2003 | Ignagni |
| 6,782,264 | B2 | 8/2004 | Anderson et al. |
| 6,834,234 | B2 | 12/2004 | Scherzinger et al. |
| 6,839,539 | B2 | 1/2005 | Durrant et al. |
| 6,845,240 | B2 | 1/2005 | Carlson et al. |
| 6,922,170 | B2 | 7/2005 | Alexander, Jr. |
| 2002/0094821 | A1 | 7/2002 | Kennedy, Jr. |
| 2003/0190919 | A1 | 10/2003 | Niemenmaa |
| 2004/0043775 | A1 | 3/2004 | Kennedy, Jr. et al. |
| 2008/0107155 | A1* | 5/2008 | Kennedy et al. .............. 375/133 |
| 2008/0194207 | A1* | 8/2008 | Kennedy et al. ........... 455/67.11 |
| 2008/0200184 | A1* | 8/2008 | Kennedy et al. ........... 455/456.1 |
| 2008/0238777 | A1* | 10/2008 | Kennedy et al. .............. 342/451 |
| 2008/0293435 | A1* | 11/2008 | Maher et al. ................ 455/456.2 |
| 2009/0186632 | A1* | 7/2009 | Kennedy et al. ........... 455/456.5 |
| 2009/0286551 | A1* | 11/2009 | Kennedy et al. ........... 455/456.1 |
| 2010/0178929 | A1* | 7/2010 | Kennedy et al. ........... 455/456.1 |

OTHER PUBLICATIONS

Ziskind, I., Wax, M., "Maximum likelihood localization of multiple sources by alternating projection", IEEE Trans. Acoust., Speech, Signal Process. vol. 36, No. 2 (Oct. 1988), 1553-1560.

Van Der Veen, M, Papadias, C. B., Paulraj, A.J., "Joint angle and delay estimation" IEEE Communications Letters vol. 1-1 (Jan. 1997), 12-14.

Schmidt, R.O. "Multiple emitter location and signal parameter estimation" Proc. RADC Spectrum Estimation Workshop, (Mar. 1999), 243-258.

Young-Fang Chen, Michael D. Zoltowski "Joint Angle and Delay estimation of DS-CDMA communication systems with Application to Reduced Dimension Space-time 2D Rake Receivers", IEEE Transactions on Signal Processing.

Paulraj, A.J., Papadias, C.B., "Space-Time Signal Processing for Wireless Communications", IEEE Signal Processing Magazine, vol. 11 (Nov. 1997), 49-83.

Paulraj, A.J., Papadias, C.B., "Space-Time Signal Processing for Wireless Communications: A Survey" Information System Laboratory, Stanford University.

Haardt, Brunner and Nossek "Joint Estimation of 2-D Arrival Angles, Propagation Delays, and Doppler Frequencies in Wireless Communications, Proc. IEEE Digital Signal Processing Workshop, vol. 1, pp. 1-4, Bryce Canyon National Park, Utah, Aug. 1998.

M.Wax, "Position location from sensors with position uncertainty", IEEE Trans. Aero., Elect. Syst. AES-19, No. 2 (Sep. 1983), 658-662.

D.J. Torrieri. "Statistical Theory of Passive Location Systems", IEEE Trans. Aerosp. Electron. Syst. AES-20, No. 2 (Mar. 1984), 183-198.

Y.T. Chan and K.C. Ho, "A simple and efficient estimator for hyperbolic location", IEEE Trans. Signal Proc. 42, No. 8 (Aug. 1994), 1905-1915.

W.H. Foy. "Position location solutions by Taylor series estimation", IEEE trans Aerosp. Electron. System AES-12, No. 2 (Mar. 1976), 187-194.

R.G. Stansfield, "Statistical theory of DF fixing", Journ. IEE 94, part IIIa (Oct. 1947), 762-770.

M.P. Wylie and J. Houtzman, "The non-line of sight problem in mobile location estimation". Proc. IEEE 5thIinternational Conf. on Universal Personal Communications, vol. 2 (Oct. 1996), 827-831.

L.Cong and W.Xuang, "Non-Line-of-Sight Error Mitigation in TDOA mobile location" Proc. IEEE Global Telecommunications conference vol. 1 (2001), 680-684.

P.C. Chen, "A non-line-of-sight error mitigation algorithm in location estimating" Proc. IEEE Conf. on wireless Communications Networking, vol. 1 (1999), 316-320.

N.J. Thomas, D.G.M. Cruickshank and D.I.Laurenson, "Performance of a TDOA-AOA hybrid mobile location system" 3G Mobile Communication Technologies Conf. Proc. 1 (Mar. 2001), 216-220.

Caffery, J., Jr., et al., "Subscriber Location in CDMA Cellular Networks," IEEE Transactions on Vehicular Technology, vol. 47, No. 2, May 1998.

Caffery, J., Jr., "A New Approach to the Geometry of TOA Location," IEEE, VTC 2000, pp. 1943-1949.

* cited by examiner

NETWORK OVERLAY GEO-LOCATION SYSTEM WITH SMART ANTENNAS AND METHOD OF OPERATION

CROSS REFERENCES

The present application is with and claims priority benefit of provisional application entitled "Geolocation of Mobile Appliances", Appl. S.No. 60/418,342 and filed on Oct. 16, 2002, the entirety of which is hereby incorporated herein by reference.

The present application is related to and concurrently filed with applications titled "A SYSTEM AND METHOD FOR ENHANCING THE ACCURACY OF A LOCATION ESTIMATE" Ser. No. 10/531,044, "WIRELESS COMMUNICATION NETWORK MEASUREMENT DATA COLLECTION USING INFRASTRUCTURE OVERLAY-BASED HANDSET LOCATION SYSTEMS" Ser. No. 10/531,042, "NETWORK OVERLAY LOCATION SYSTEM AND METHOD FOR AIR INTERFACE WITH FREQUENCY HOPPING" Ser. No. 10/531,041, "A SYSTEM AND METHOD FOR ESTIMATING THE MULTI-PATH DELAYS IN A SIGNAL USING A SPATIALLY BLIND ANTENNA ARRAY, Ser. No. 10/531,039, and "SYSTEM AND METHOD FOR OPERATING A NETWORK OVERLAY GEO-LOCATION SYSTEM WITH REPEATERS" Ser. No. 10/531,038, each filed Oct. 16, 2003, the entirety of each of these applications is incorporated herein by reference.

BACKGROUND

Applicant's disclosure is directed to a wireless communications network overlay for determining the location of mobile appliances.

The use of wireless communication devices such as telephones, pagers, personal digital assistants, laptop computers, etc., hereinafter referred to collectively as "mobile appliances", has become prevalent in today's society. Recently, at the urging of public safety groups, there has been increased interest in technology which can determine the geographic position, or "geo-locate" a mobile appliance in certain circumstances. For example, the Federal Communication Commission (FCC) has issued a geo-location mandate for providers of wireless telephone communication services that puts in place a schedule and an accuracy standard under which the providers of wireless communications must implement geo-location technology for wireless telephones when used to make a 911 emergency telephone call (FCC 94-102 E911).

In addition to E911 emergency related issues, wireless telecommunications providers are developing location-enabled services for their subscribers including roadside assistance, turn-by-turn driving directions, concierge services, location-specific billing rates and location-specific advertising.

To support FCC E911 rules to locate wireless 911 callers, as well as the location enabled services, the providers of wireless communication services are installing mobile appliance location capabilities into their networks. In operation, these network overlay location systems take measurements on RF transmissions from mobile appliances at base station locations surrounding the mobile appliance, and estimate the location of the mobile appliance with respect to the base stations. Because the geographic location of the base stations is known, the determination of the location of the mobile appliance with respect to the base station permits the geographic location of the mobile appliance to be determined. The RF measurements of the transmitted signal at the base stations can include the time of arrival, the angle of arrival, the signal power, or the unique/repeatable radio propagation path (radio fingerprinting) derivable features. In addition, the geo-location systems can also use collateral information, e.g., information other than that derived for the RF measurement to assist in the geo-location of the mobile appliance, i.e., location of roads, dead-reckoning, topography, map matching etc.

In a network-based geo-location system, the mobile appliance to be located is typically identified and radio channel assignments determined by (a) monitoring the control information transmitted on radio channel or wire line interface for telephone calls being placed by the mobile appliance to detect calls of interest, i.e., 911, (b) a location request provided by a non-mobile appliance source, i.e., an enhanced services provider. Once a mobile appliance to be located has been identified and radio channel assignments determined, the location determining system is first tasked to determine the geo-location of the mobile appliance, and then directed to report the requesting entity or enhanced services provider.

The monitoring of the RF transmissions from the mobile appliance or wire line interface to identify calls of interest is known as "tipping", and generally involves recognizing a call of interest being made from a mobile appliance and collecting the call setup information. Once the mobile appliance is identified and the call setup information is collected, the location determining system can be tasked to geo-locate the mobile appliance.

FIG. 1 shows a conventional mobile-appliance communication system having a mobile switch controller 45 connected to base stations 10 for communicating with a mobile appliance 20. Each base station 10 contains signal processing equipment and an antenna for transmitting to and receiving signals from the mobile appliance as well as other base stations and centrally located control and processing stations. A mobile appliance location determining sensor 30 may be positioned at some or all of the base stations 10 to determine the location a mobile-appliance within the signal coverage area of the communication system. The antenna may be a multi-element antenna.

A network overlay system is generally composes of two main components, one that resides at the base station that makes measurements on the RF signal emanating from the wireless device, the wireless location sensor 30 and one that resides at the mobile switch that tasks the wireless location sensor groups to collect data and then uses the data to compute a location estimate, this component generally referred to as the Geolocation Control System (GCS) 50. In the normal course of operation, the GCS is tasked by an outside entity to generate a location estimate on a particular mobile appliance. The tasking is accompanied by information on the mobile of interest including the serving base station and sector for the call and the RF channel (frequency, time slot, CDMA code, etc.) being used by the wireless communications network to complete the wireless connection. Once the GCS receives this tasking, based on the serving sector, it tasks a set of WLS units to make measurement on the RF emission of the mobile. The WLS units make the measurements, and report them to the GCS. The GCS then computes a location estimate using some mathematical or data matching algorithm. Alternatively, RF or wired links containing control channels used to set up calls in the wireless network can be scanned to detect the placement of a call of interest. The signaling that occurs on an RF control channel can be used to determine location, or RF traffic channel parameters can be extracted from the control channel messaging to determine which traffic channel to use for location related measurements The signal reception area of a base station is generally divided into sectors of various orientations depending on the type of antenna configuration and signal processing equipment. FIG. 2 shows a typical base station coverage area divided by sectors each with a 120 degree bandwidth. The mobile appliance communication system is designed so that the mobile appliance preferably has the capability to communicate with at least one base station while in the coverage area.

The capability of the base stations to receive signals from the mobile appliance is base on a number of factors such as geographic location of the base station with respect to the location of the mobile appliance, the height of the antenna, the number of sectors and the orientation of the sectors.

To meet the ever growing demand for mobile communication, wireless operators are using smart antennas to unlock fixed cell site sectorization to manage and distribute traffic loading more effectively. The geographic distribution of traffic across a network even within a single cell varies considerably, in a typical three sector cell as shown in FIG. 2, the traffic density in the most heavily loaded sector 201 is often more than twice that in the least-loaded sector 203.

As a result, some cells may have sectors that are fully loaded and where traffic is blocking up, while other sectors of the same cell are well below peak loading and have spare capacity, On a larger scale, high traffic areas such as highway interchanges, urban centers and shopping centers create hot spots that strain capacity even while other network resources go unused in low-traffic areas. This variability in the traffic density creates network inefficiencies which have economic effects on the wireless operators.

The use of smart antennas allow wireless operations to control and optimize coverage with flexibility and precision. Again, working within a three 3 sector configuration, operators can adjust sector orientation by pointing angles in 30 degree increments, select from beam widths of 60, 90, 120, 180 and 240 degrees, and change gain settings to expand or contract coverage in highly localized areas, without the expense of a custom antenna.

Using this flexible configuration options of smart antenna, operators can tailor a cell's coverage to fit its unique traffic distribution, thus operators can significantly benefit from matching usage levels with an appropriate sector beam width. A relatively narrow beam width 30 degrees to 60 degrees horizontal, for instance might cover a heavy handoff area or a highway corridor, while a moderate beam width 90 degrees horizontal might serve a suburban or light urban area. In low traffic areas such as mountains, water or rural environments antennas with wider bandwidths can provide the most effective use of network resources.

Operators also can use smart antennas to respond quickly to time varying traffic patterns. Using the system's operation and administration software, operators can adjust sector configurations on demand and within minutes. As a result, operators can modify a cell's operation based on the time of day or day of the week, or to accommodate and anticipated surge in call volume from a sporting or community event.

Operators using smart antennas to change the size or orientation of sectors can shift the traffic load from an overtaxed sector to one or more underused sectors, thus in effect, routing network capacity where and when it is required. For example, a comparison can be made between FIG. 2 where conventional sectors are illustrated and FIGS. 3a and 3b illustrating the controllable sectors enabled with the use of a smart antenna. In FIG. 2 traffic loads across the three sectors 200 vary greatly, with a single sector 201 handling traffic for the office park 211 and most of the residential area 212. By contrast, the cell's sectors 300 in FIGS. 3a and 3b have been resized and reoriented to the traffic load is more evenly distributed among the three sectors. Each sector's beam width has been altered to best accommodate the peak traffic load in that sector. In FIG. 3a the narrow sector 301 covering the office park 211 maximizes capacity for a high traffic area, while the relatively wide sector 303 covering the water 214 provides adequate capacity for a low-traffic area. And as shown FIG. 3b, the sectors can be redefined to provide narrow sector 303 coverage to the football stadium 215 when a large event is taking place.

Smart antennas refer to antennas that spatially steer or switch beams or nulls, or dynamically reallocate available RF channels to different sectors in a base station. In general, they do this as a function of the loading on the base station, or based on the direction of arrival of the RF energy from mobile appliances. The purpose of these functions as discussed above is to extend base station range, improve signal quality, and/or increase the number of users served by the base station. Smart antennas are generally made up of antenna arrays, and accompanying electronics boxes. FIG. 4 shows the principal system elements of a smart antenna. The smart antenna 400 typically consists of a sensor array 401 (antenna array), a pattern-forming network 410 and the adaptive processor 413. The pattern-forming network 410 and the adaptive processor 413 make up the electronic box referred to earlier. The antenna array 401 consists of N antennas 402 designed to receive (and transmit) signals. The physical arrangement of the array (linear, circular, etc.) is arbitrary, however, the physical arrangement fundamentally dictates the capability of the smart antenna 400. The output of each of the N antenna element 402 is fed into the pattern-forming network 410, where the outputs are processed by filters 411. These filters determine the directional pattern of the smart antenna. The outputs of the filters 411 are then summed 412 to form the overall output y(t). The complex weights of the filters 411 are determined by the adaptive processor 413.

Smart antennas can operate on either the forward link, reverse link, or both. Smart antennas can be a part of the base station hardware supplied by the infrastructure vendor, or an appliqué supplied by a third part vendor. In general, the operation of the smart antenna (null/beam steering/switching or channel sector switching) is not known to the rest of the host base station or the wireless infrastructure.

Network overlay location systems typically locate a mobile appliance on the traffic channels of a wireless network. The system typically uses sensors employing techniques of time difference of arrival (TDOA) supplemented with Angle of Arrival (AOA) in some cases to perform a multi-site location computation. The traffic channel assignment information is provided through a separate process, with one option being a wire line interface between the MPC 40 and the GCS 50 (FIG. 1) providing MOBINFO (IS-41 Mobile information) parameters passed by the Mobile Positioning Center (MPC) 40 (FIG. 1) as part of the GPOSREQ (J-STD-036 Geolocation Position Request) message. Another option for the traffic channel assignment data is the wire line interface 41 between the base stations and the mobile switch center (MSC) 45. Neither the base station 10 nor the switch knows that a smart antenna is serving a call. Therefore the GPOSREQ information from the MPC is not able to alert the Geolocation system that a smart antenna is in use. Geolocation systems locate the transmitter using the corresponding MOBINFO parameters passed from the MPC 40. In the case of a mobile served by a smart antenna, information provided to the location system by the MPC on the serving sector may or may not be accurate. The smart antenna may have moved the RF channel from the original serving sector to another to accommodate current traffic needs, or could have spatially steered a beam or null that moves the original coverage of area of a sector to a new geographic area. The overall affect of these smart antenna functions is that the mobile of interest may or may not be in the original geographic area defined by the sector communicated to the location system by the MPC 40 which can frustrate the geo-location process.

For example, FIG. 5a shows a communication system with 7 base stations and their associated overage areas 501. A base station 510 is designated to operate in a three-sector mode (A 511, B 512, and C 513). The infrastructure equipment (mobile switch, not shown) contains data that indicates what RF channels are mapped to what sectors at the base station 510. In the example shown channels u and v, w and x and y and z are mapped (assigned) to sectors A 511, B 512 and C 513 respectively. Without a smart antenna operating, when a mobile 500 is provided service on a traffic channel, the sector serving the mobile would be known by the mobile switch (sector A 511) based on the assigned RF channel/traffic channel (channel v). The geo-location system would task sensors in the vicinity of the serving A sector area, namely sensors in sector 523 of base station 520, and sector 533 of base station 530 to locate the mobile. Other sectors can also be tasked on their vicinity to the serving sector, however only the two closest are shown for clarity of illustration.

If a smart antenna is operating at base station 510, then the smart antenna can move the assigned RF channel, z from sector C 513 to another sector A 511 through an RF switch in the smart antenna to accommodate extra traffic seen on the A sector 511 for this time of day (perhaps a major commuter route is served by the A sector 511, and additional RF channels are allocated to serve it by taking channels from the C sector 513). Prior art geo-location systems attempt to locate the mobile by tasking sensors around the C sector 513, since z is mapped to C, and the smart antenna and its dynamic allocation of channels and variations in sectors is invisible to the base station and the MPC. The sensors in sector 542 of base station 540 and sector 551 of base station 550 as shown in FIG. 5b would be tasked to locate the mobile 500. Thus a poor or perhaps no location would be estimated because the sensors tasked are not the one in proximity to the actual location of the mobile appliance.

Similarly as shown in FIG. 5c, if the smart antenna changed the beam width and orientation of the of the sectors by narrowing the A sector to cover a particularly dense traffic area and widened the beam width of B sector 512, prior art geo-location systems attempting to locate mobile appliance 500 would assume the mobile is in the pre-assigned coverage area occupied by sector A 511. Therefore the system would tasks sensors in sector 561 in base station 560 and sector 573 in base station 570 to locate the mobile. However, as before these are not the sectors closest in vicinity to the mobile and thus a poor location would be estimated.

Additionally, the RF signals from the mobile must pass through the smart antenna array and the accompanying electronics. These entities add delay to the time of arrival of the RF when compared to the normal path delay that would be encountered at the base station without a smart antenna present and thus can lead to inaccurate location results when time-based location techniques such as TDOA are used.

Therefore with the increased used of smart antennas for dynamically adjusting the coverage sectors, there is a need for a geo-location system which is capable of use with communication system which implement sector modifications with smart antenna.

In view of this need, it is the object of the present disclosure to obviate the deficiencies in the prior art and present a method for determining a location of a target mobile appliance, in a wireless communication system with a network overlay geo-location system. The wireless system includes plural base stations and a MPC, each of the base stations include pre-assigned sectors defining a coverage area. One of the base stations includes a smart antenna. The method includes the steps of determining the serving sector from the pre-assigned sectors and using a database to determine if the serving sector's base station has a smart antenna. The method involves scanning antennas elements of the serving sector's base station, prior to pattern forming, for the target mobile appliance's signal to find the actual sector for the mobile appliance. The system then tasks sensors in proximity of the actual sector to locate the mobile appliance.

It is also an object of the present disclosure to present a novel method for determining the location of a target wireless appliance in a network overlay geo-location system for wireless appliances operating in a host wireless communication system. The host system includes a several base stations including sectors defining a coverage area, and one of the base stations employs a smart antenna. The host system also includes a mobile positioning center which provides the geo-location system with information parameters to assist in the location acquisition of the wireless appliance. The method determines a sector of interest from the information parameters and tasks sensors near each sector of the sector of interest base station to locate the mobile appliance.

It is another object of the present disclosure to present a novel method for determining the location of a mobile appliance independently of sector information provided by the MPC. The wireless communication system having a network overlay geo-location system including plural base stations and an MPC. The base stations having assigned channels for each sector representing a coverage area, and one or more of the base stations include smart antennas for adapting the sectors within the coverage area including reassignment of channels. The method entails tasking plural geo-location sensors in the geo-location system to search for the signal and selecting a set of sensors based on the mobile appliance's signal parameters at each sensor and locating the mobile appliance with the set of sensors.

It is still another object of the present disclosure to present a novel improvement for a method of locating a mobile appliance operating in a wireless communication system with at least one base station employing a smart antenna. The method including receiving mobile information from a MPC, including information for determining an assigned sector, and tasking geo-location sensors proximate to a search area to locate the mobile appliance. The improvement includes for each antenna output associated with the assigned sector's base station, measuring a parameter of the mobile appliance's signal; and, selecting the search area based on the measured parameters.

It is yet another object of the present disclosure to present a novel method for determining the location of a target wireless appliance from the target wireless appliance's signal parameters measured at plural geo-location sensors. The method including determining from a database which geo-location sensors are located at base stations with smart antennas; adjusting the measured parameters from geo-location sensors located at base stations with smart antenna; and, determining the location of the mobile appliance from the adjusted measured parameter.

It is an additional object of the present disclosure to present a novel wireless communication system with a network overlay geo-location system having a plurality of sensors located at plural base stations. The system includes a base station with a smart antenna, the smart antenna having an antenna array and a pattern-forming network. The system also has a mobile positioning center in communicational connection with the network overlay geo-location system. The sensors of the network overlay geo-location system being connected to the smart antenna at an interface between the antenna array and the pattern-forming network.

It is yet an additional object of the present disclosure to present an improved network overlay geo-location system in a wireless communication system with a host base station having a smart antenna. The smart antenna including an antenna array and a pattern-forming network and the sensors are connected to the smart antenna at an interface between the antenna array and the pattern forming network.

It is still an additional object of the present disclosure to present a novel method for locating the mobile appliance. The method includes the steps of: retrieving serving sector information from the mobile position center, determining from a database if the serving sector is at a base station with a smart antenna and switching a network overlay geo-location system to a selected one of two different operating modes based on the determination.

These objects and other advantages of the disclosed subject matter will be readily apparent to one skilled in the art to which the disclosure pertains from a perusal or the claims, the appended drawings, and the following detailed description of the preferred embodiments.

DETAILED DESCRIPTION

In order for a network overlay geolocation system to operate in a smart antenna-equipped base station/network, innovations over standard network overlay geolocation systems must be employed that do not rely solely upon the mobile information currently supplied by the mobile positioning center, or equivalent.

Figure 1:
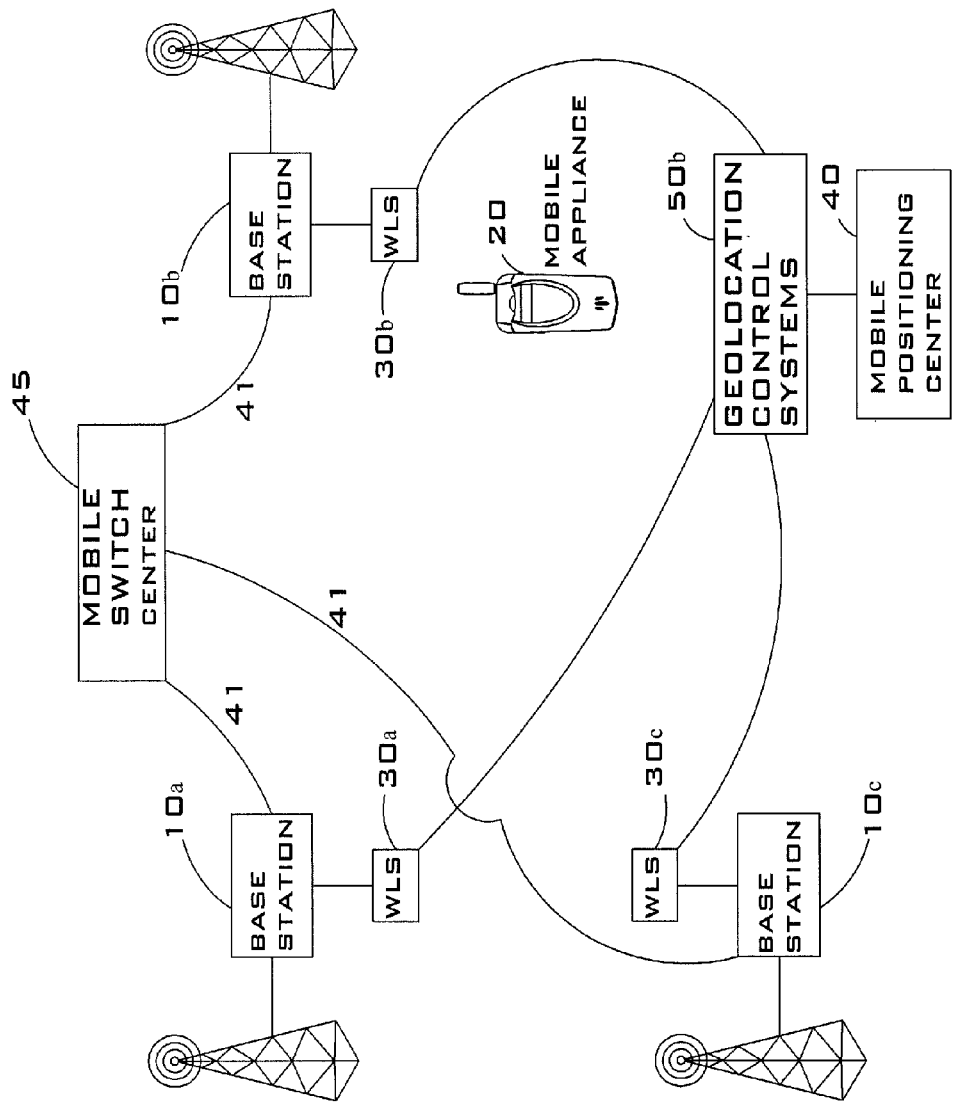
FIG. 1 is an illustration of a standard network overlay geo-location system with host wireless communication system.
Figure 2:
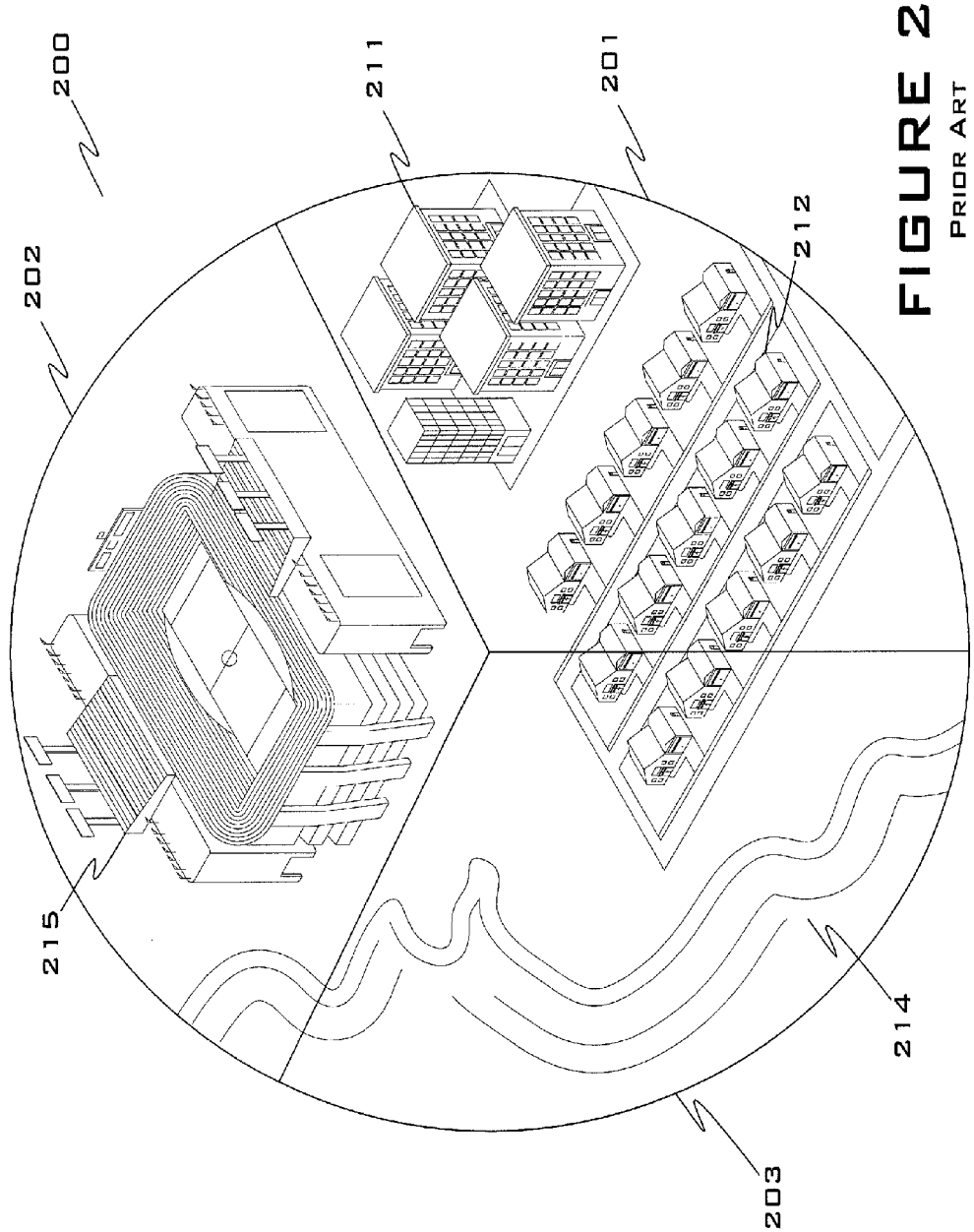
FIG. 2 is a representation of a typical base stations sectorized coverage area.
Figure 3A:
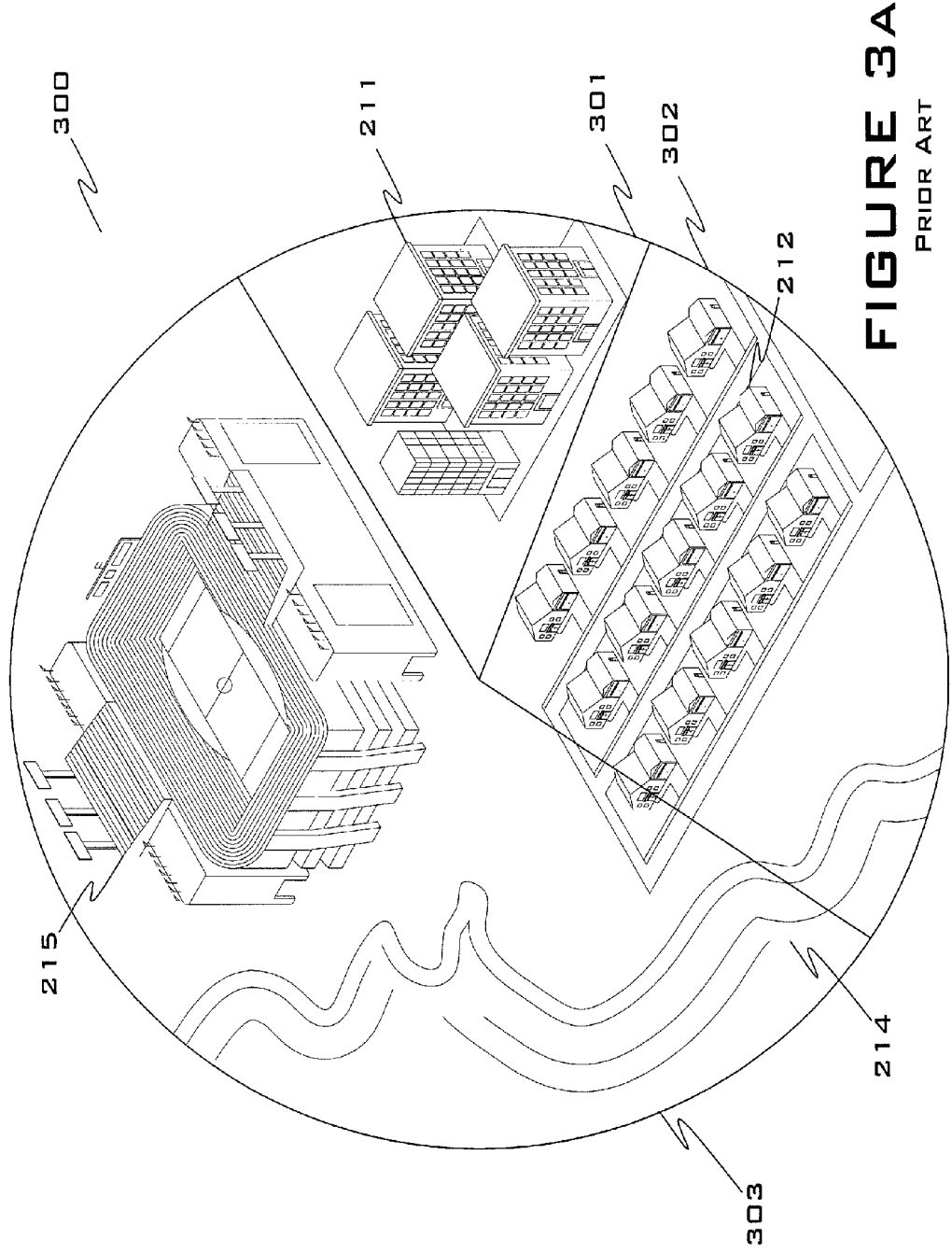
FIGS. 3a and 3b is a representation of a sectorized coverage area of a base station utilizing a smart antenna.
Figure 3B:
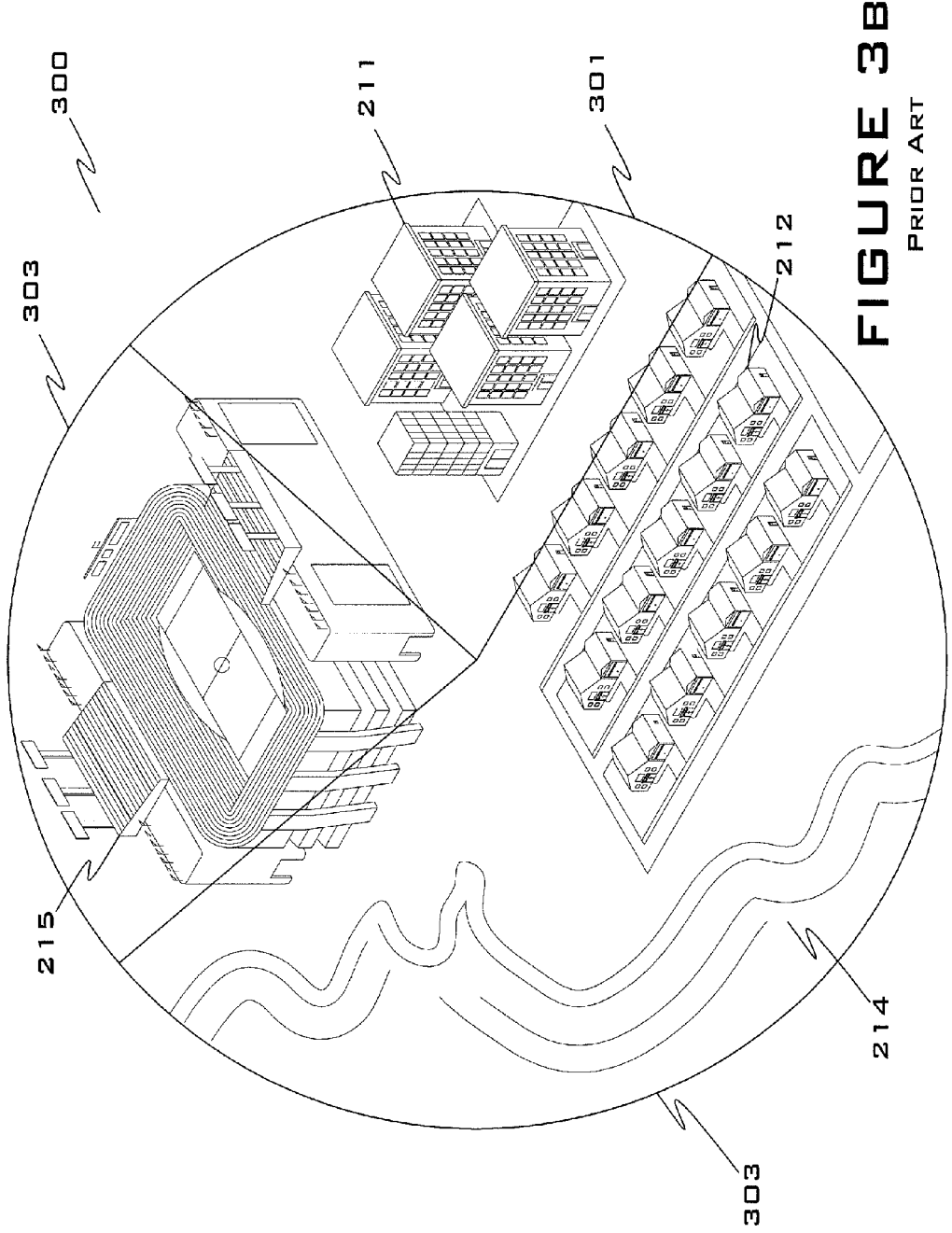
Figure 4:
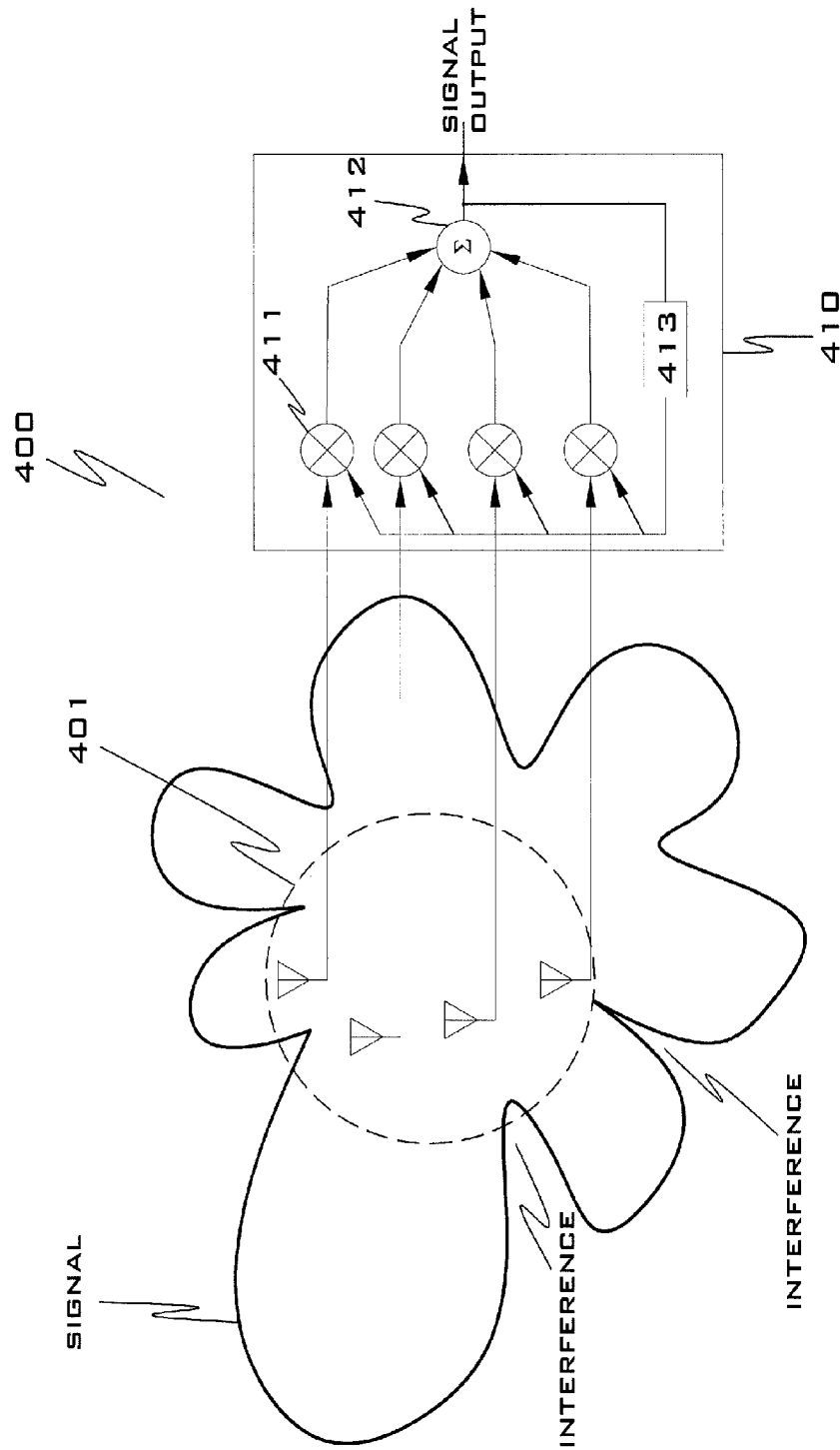
FIG. 4 is a representation of a smart antenna.
Figure 6:
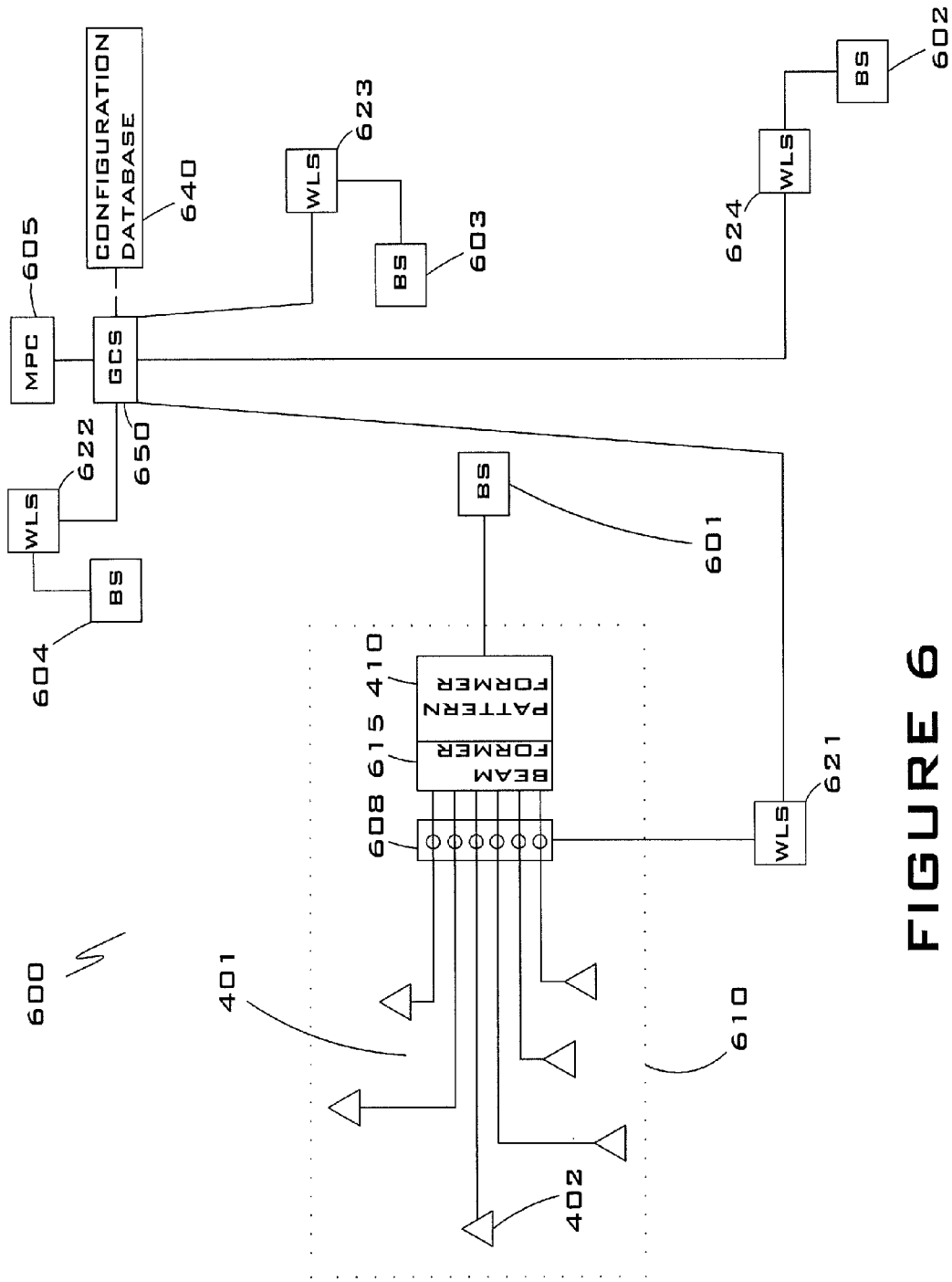
FIG. 6 is a representation of a network overlay geo-location system with host wireless communication system according to an embodiment of the disclosed subject matter.

FIG. 6 is an embodiment 600 of a wireless communication system with a network overlay geo-location system that accounts for the sector and channel variations presented by the use of a smart antenna in locating a target mobile appliance. As in FIG. 1, the host wireless communication system includes a plurality of base stations 601-604 and a mobile positioning center (MPC) 605 (FIG. 1). One of the base stations 601 in FIG. 6 is shown with a smart antenna 610. The smart antenna 610 contains the same features with the same reference numerals as described previously in FIG. 4. The network overlay geo-location system is formed by a central processing unit, GCS 650 and a plurality of sensors (621-624) located at the base stations.

Normally connected to the mobile positioning center is a configuration database 640 which includes the wireless system configuration information, including channel assignment, sector size and sector orientation as originally configured or amended. The configuration database reflects the set parameters, not necessarily the current base station parameter. The configuration database 640 in the embodiment of FIG. 6 also includes an extra field beyond the prior art. This additional field simply contains information designating which base stations within the communication system have or use smart antennas. This information regarding the presence of smart antennas at the base stations can alternatively be contained in a database accessible to the geo-location system located other than at the GCS, likewise in the embodiment shown, the database need not be contained in the GCS since only access is required. The system configuration database can also be augmented with a field to indicate which sensors are located at smart antennas, rather than which base stations have smart antennas.

The information contained in the extra field can be used as a key reference for the geo-location system in determining the manner in which sensors are selected to locate the target mobile appliance. Specifically, this field can be used to select a mode of operation of the geo-location system. In one mode, where no smart antennas are present, the ordinary method of selecting sensors is implemented since the information provided by the MPC and which the selection is based are most likely valid. In another mode the geo-location system proceeds with the selection of neighboring sectors while recognizing the possible reallocation of the sector configuration enabled by the smart antennas and accounting for such possible changes.

In base stations 601 the geo-location sensors 607 or wireless location sensors (WLS) are specifically connected to the smart antenna by an interface between the antenna array 401 of the smart antenna 610 and the pattern-forming network 410 with interface 608. The location of the geo-location sensors 621 interface 608 to the smart antenna/base station equipment ensures its antenna feeds are not affected by the dynamic spatial patterns of the smart antenna 610, while the embodiment shows a single WLS 621 and interface 608, multiple sensors and interfaces are equally functional, for clarity, a composite sensor is shown. Interfaces that meet these criteria include after the antenna array 401, or after the antenna array and fixed beam formers 615 or switches (not shown) in the RF chain in the smart antenna 610. Both of these interfaces are before the dynamic beam/null/sector steering/switching apparatus (i.e. pattern-forming network 410) in the smart antenna 610. In other words the output of the pattern-forming network of a smart antenna is indistinguishable in regards to channel assignment and other sector characteristics from the antenna output in conventional fixed channel fixed sector antennas, even though the sector characteristics may be entirely different.

The embodiment shown in FIG. 6 includes a fixed beam former 615 which is commonly used in standard base stations for several known reasons that will not be further expanded here. As stated above the fixed beam former 615 does not act to dynamically change or alter the sector/channel characteristics from that presumed in the system configuration database.

Figure 7:
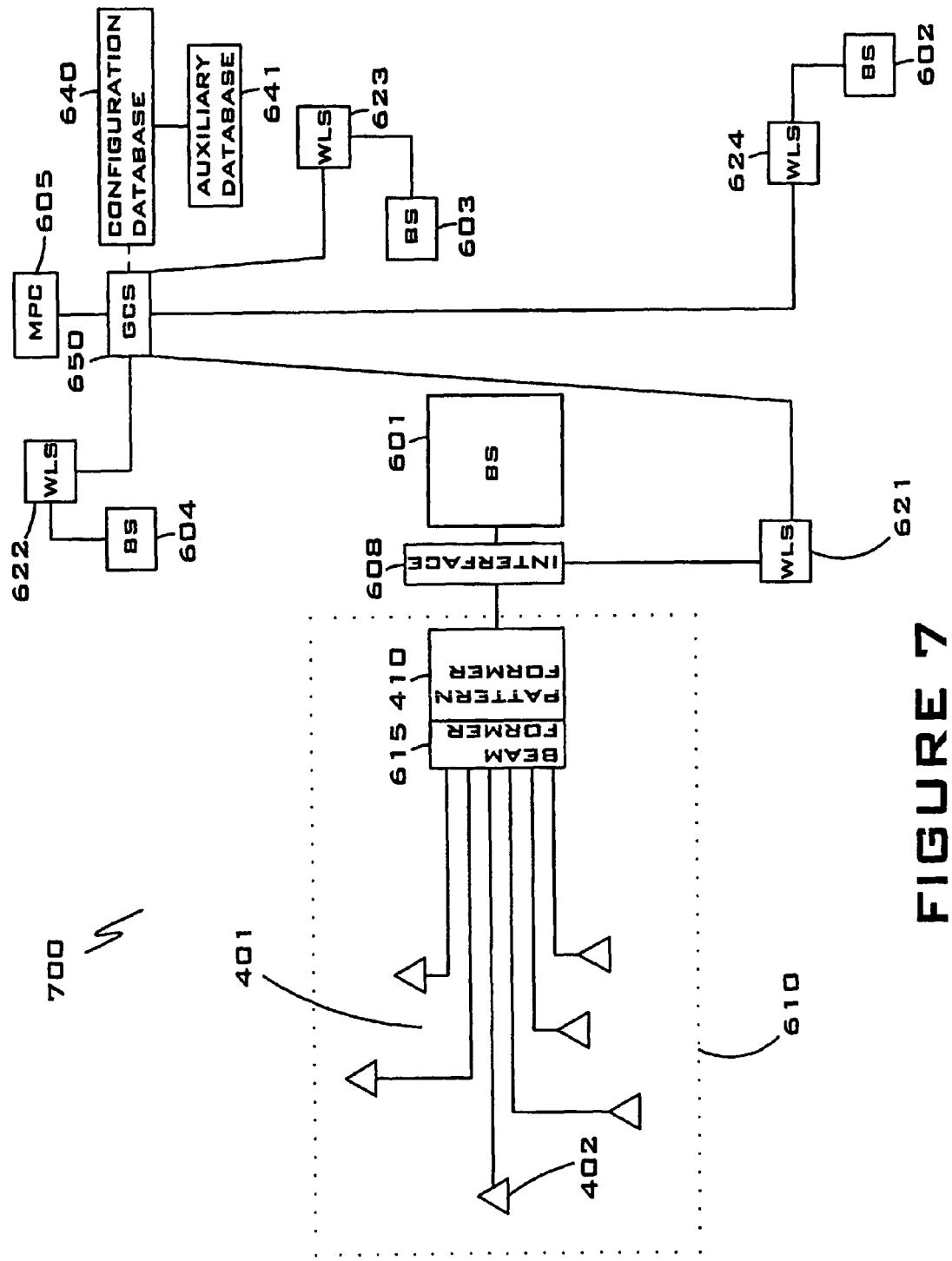
FIG. 7 is a representation of a network overlay geo-location system with host wireless communication system according to another embodiment of the disclosed subject matter.

The embodiment 700 shown in FIG. 7 also includes another database or database fields which include time adjustments for sensors attached to smart antennas. In smart antennas the additional time delay elements in the RF path between the antenna array 401 and the location sensor (WLS) exist due to the processing in the pattern forming network. In this embodiment the sensors are located in the receive path after the pattern-forming network. These time adjustments are stored in the auxiliary database 641 and are sensor specific. The time delay adjustments can be empirically or experimentally determined. In this way, the time delay for these elements can be compensated for in the time difference of arrival calculation. The key can also trigger the execution of other function at the sensors as described below.

The sensor at the base stations with smart antennas can operate in a mode where the mobile appliance of interest is not located within the sector coverage area as indicated by the tasking parameters, but instead in the sector where it actually resides. As discussed previously the unique operation in the network overlay location equipment to accommodate this situation is necessary, so as to not rely on the serving sector information provided when a smart antenna is operating at the base station, but instead to rapidly scan all of the antenna outputs provided to the location system to find the antenna that best receives the mobile in question. Once the serving area is identified, then the sensors in the proximity of the actual mobile's position can be switched to the proper antenna elements, and tasked to provide time or angle data on the mobile to determine a position.

To determine the antenna output that best receives the mobile, power level can be used. Existing radio assets and antenna switches in the sensors (WLS) can be used to perform the scanning function.

Figure 8:
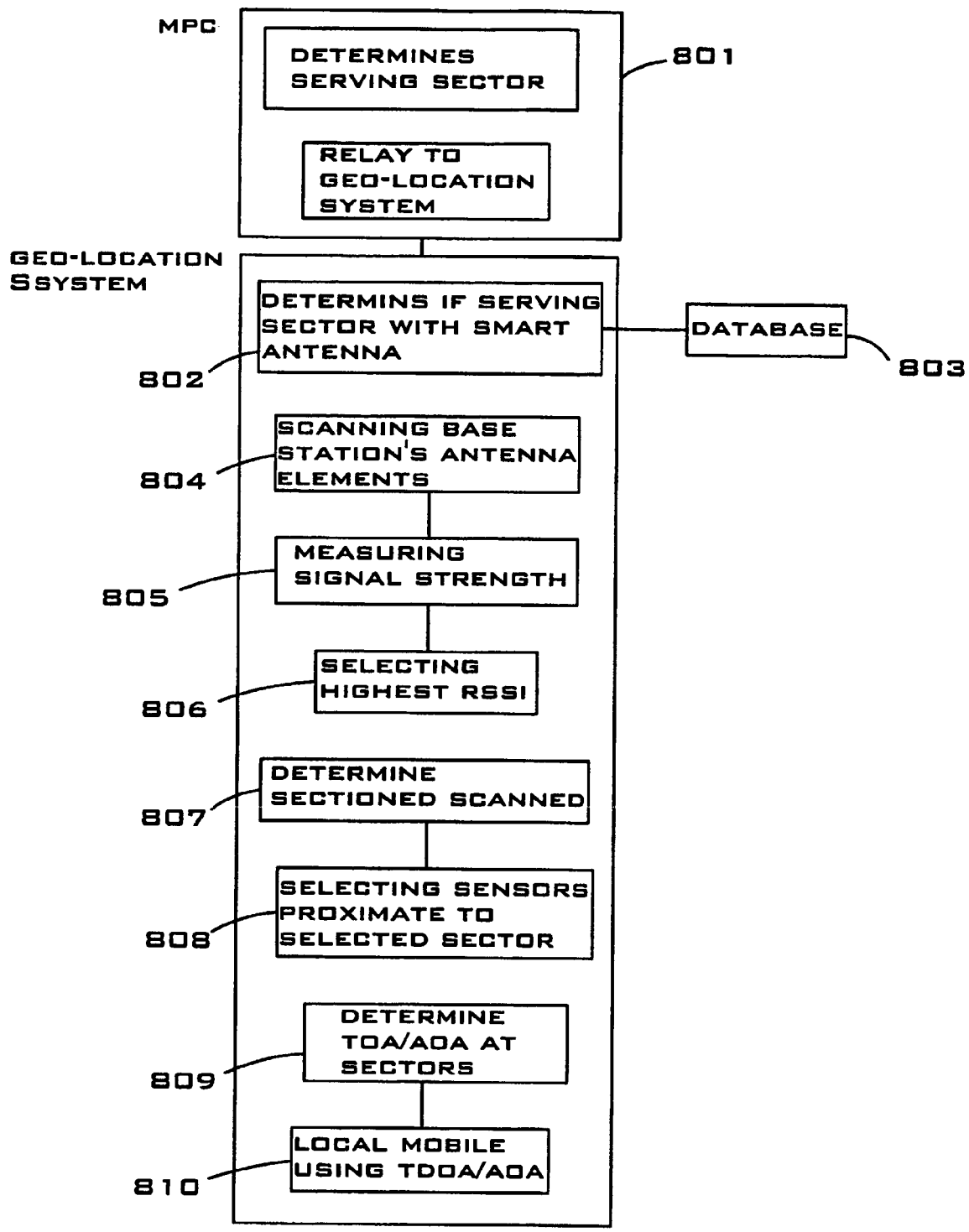
FIG. 8 is a flow chart of the operation of the geo-location system according to an embodiment of the disclosed subject matter.

FIG. 8 is a representative flow chart of the operation of the geo-location system for locating a mobile appliance in a wireless communication system employing smart antenna at one or more of its base stations. As shown is block 801 the MPC generates the mobile information, including the serving sector from information provided by the wireless network, and this information is relayed to the geo-location system. The geo-location system in block 802 accesses a database 803 which includes the extra field that indicates which sectors employ smart antennas.

The geo-location system scans antenna elements of all the sectors in the serving sectors base station and may also scan antenna elements in neighboring base stations as shown in block 804. A parameter, such as received signal strength, or a quality metric formed from a cross correlation of known features of the target mobile signal, such as a training sequence pattern, pilot signal or other known data, is estimated or measured for each of the antennas scan in block 805. The geo-location system using the received signal strengths or other suitable signal parameter determines or selects the actual geographic sector serving the mobile appliance as indicated in Block 806 and determines sector sensors (WLS) in the vicinity of the actual serving sector in block 807 which are tasked to determine the time of arrival of the mobile appliances signal in block 808. The geo-location system then locates the mobile appliances by the time-of-arrival at the selected sector sensors using time-difference-of-arrival or angle-of-arrival in blocks 809, 810. Since the actual sector is determined and used to identify sensors in the vicinity, the accuracy of the information provided by the MPC will not affect the accuracy of the determined location. The mobile appliance's signal is typically a traffic channel, however, reverse pilot signals available in 3rd Generation CDMA systems can also be used in the geo-location system.

Figure 5A:
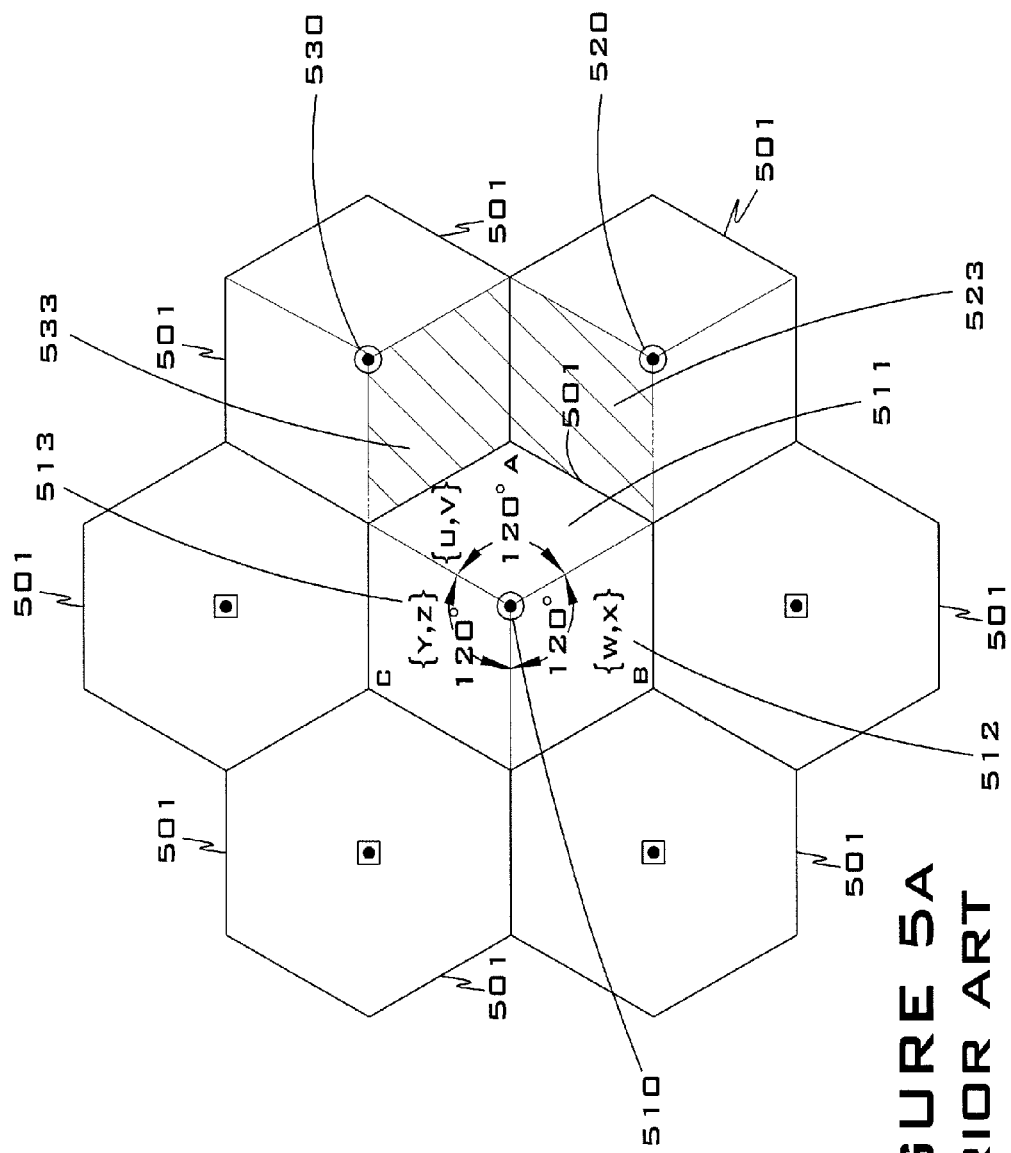
FIG. 5a is a representation of cells in a communication system, illustrating the selection of proximate sectors.
Figure 5B:
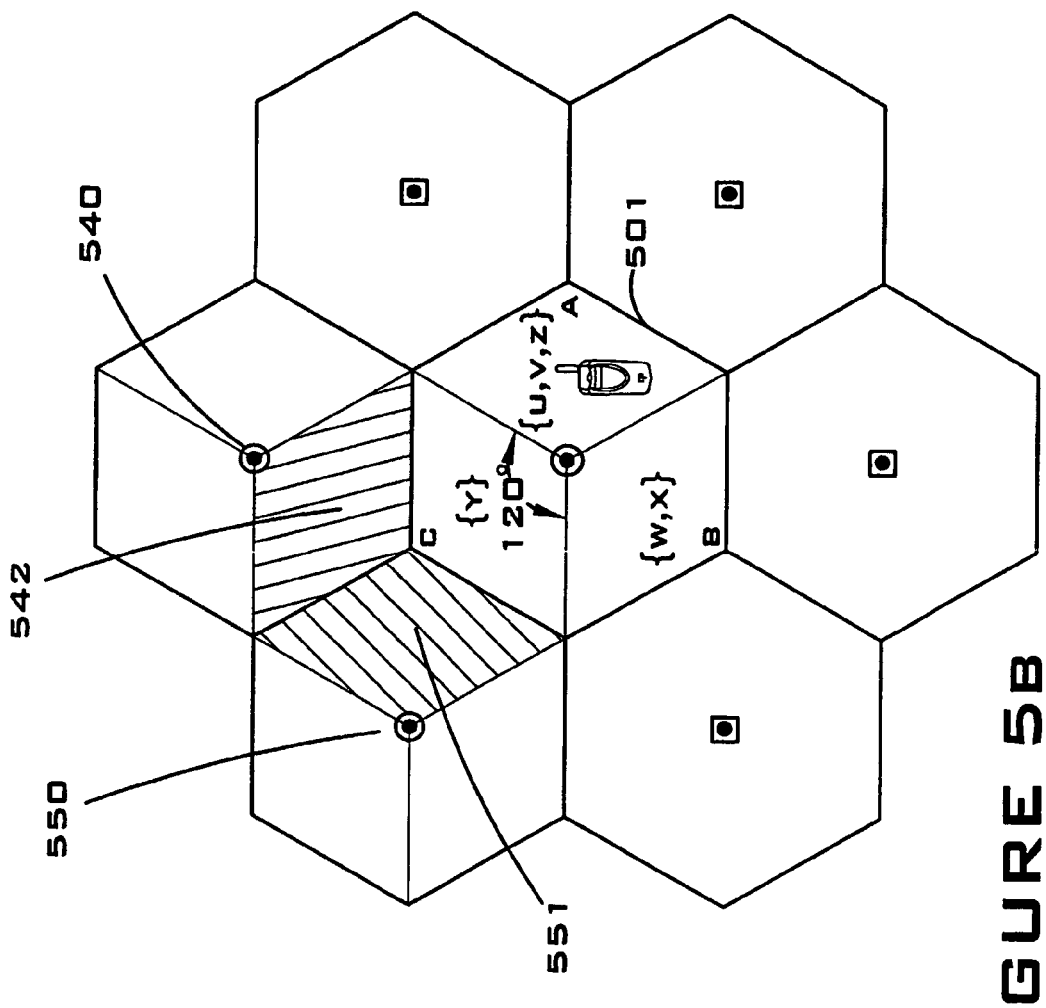
FIG. 5b is a representation of cells in a communication system with base stations using smart antennas switching channel assignments, illustrating the selection of proximate sectors.
Figure 5C:
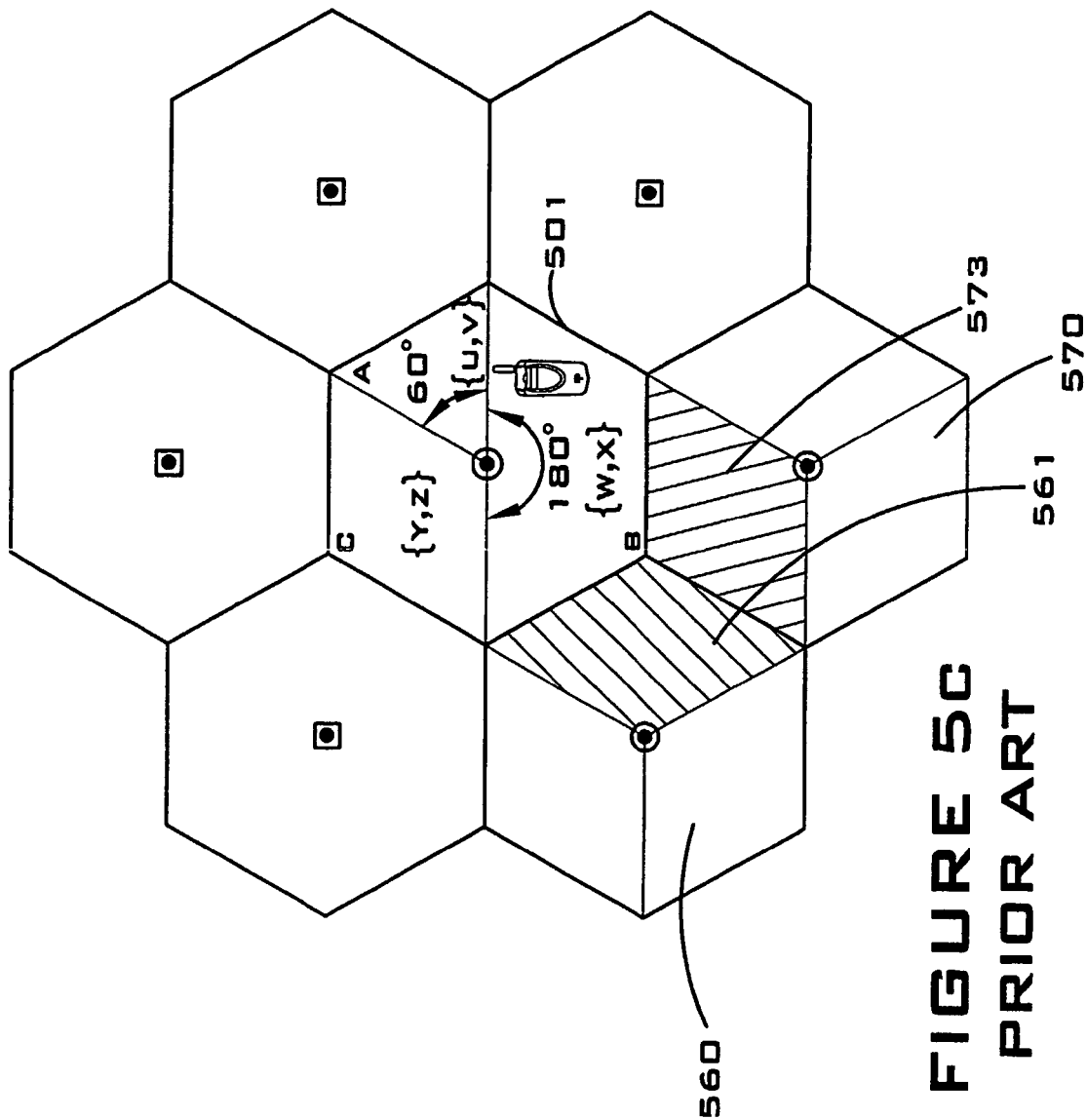
FIG. 5c is a representation of cells in communication system with base station using smart antennas changing sector beam width and orientation, illustrating the selection of proximate sectors.
Figure 9:
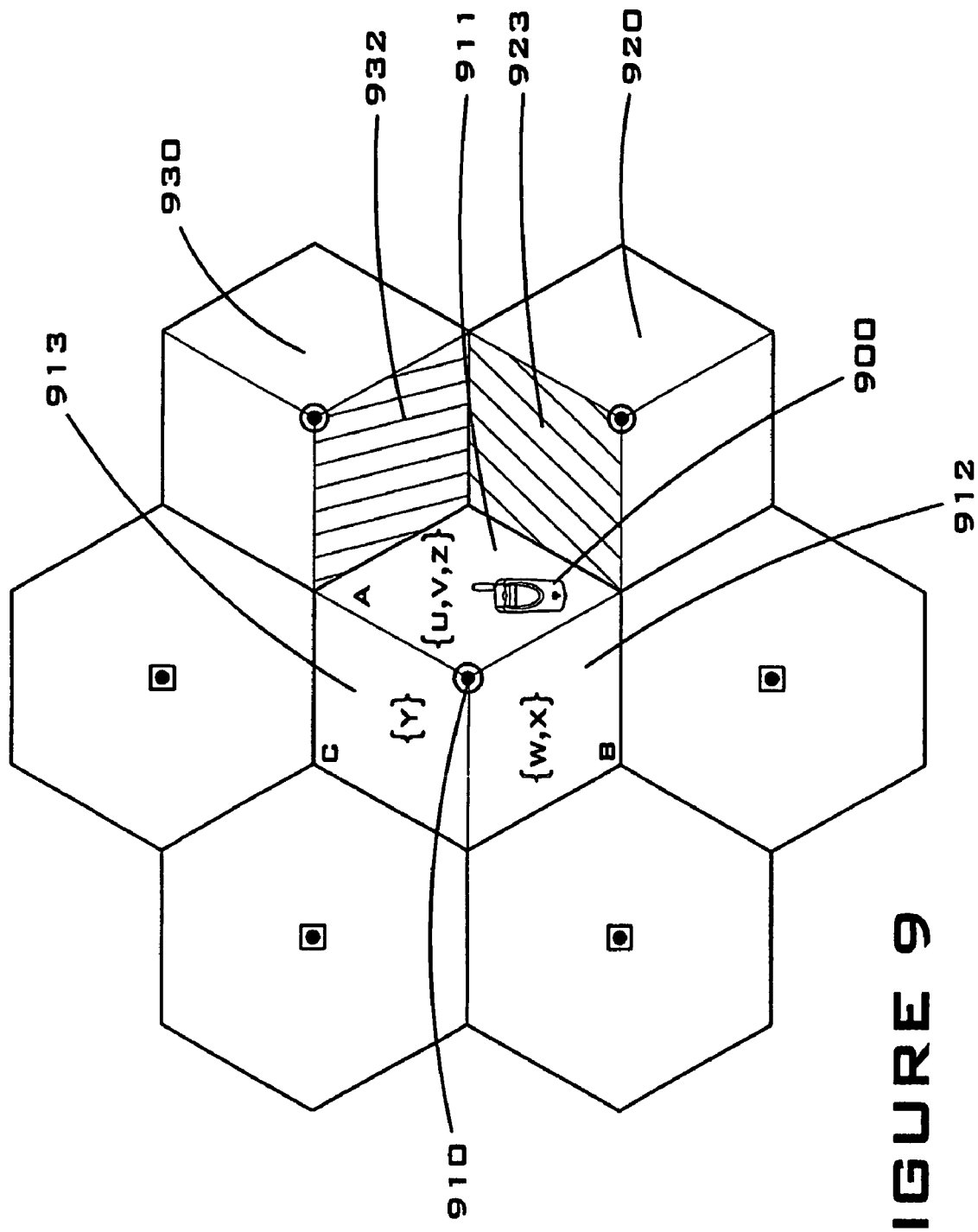
FIG. 9 is a representation of cells in a communication system locating a mobile according to the embodiment of FIG. 8.

FIG. 9 is a representation of the process used to address the situation presented in FIG. 5b. A smart antenna operating at base station 910 reassigns RF channel, z from sector C 913 to sector A 911 through an RF switch in the smart antenna to accommodate extra traffic seen on the A sector 911. The MPC relays mobile information to the geo-location system, including information designating sector C 913 as the serving sectors. The geo-location system accesses a database, or a field in the system configuration database indicating the serving sector C 913 is at a base station with a smart antenna. The geo-location system scans all the antenna elements of sectors 911, 912 and 913 and measures the received signal strength of the mobile signal. The measurements indicate the strongest signal from an antenna element located in the A sector 911 and thus tasks the sensors (WLS) in sectors proximate to the actual sector A 911, namely the sensor at sector 932 of base station 930 and sector 923 of base station 920 to record the time of arrival of the mobiles signal. Of course, as stated previously, other sensors in the vicinity of the actual sector can also be tasked to locate the mobile appliance, however are not shown for clarity. The geo-location system then uses these times of arrival to calculate time difference of arrival, angle of arrival or other known means to locate the mobile appliance 900. The results of the described method, when compared with that shown in FIG. 5B is clearly advantageous. The similarly advantageous sensor selection and geo-location would result if the operation was applied to the example demonstrated in FIG. 5c.

Figure 10:
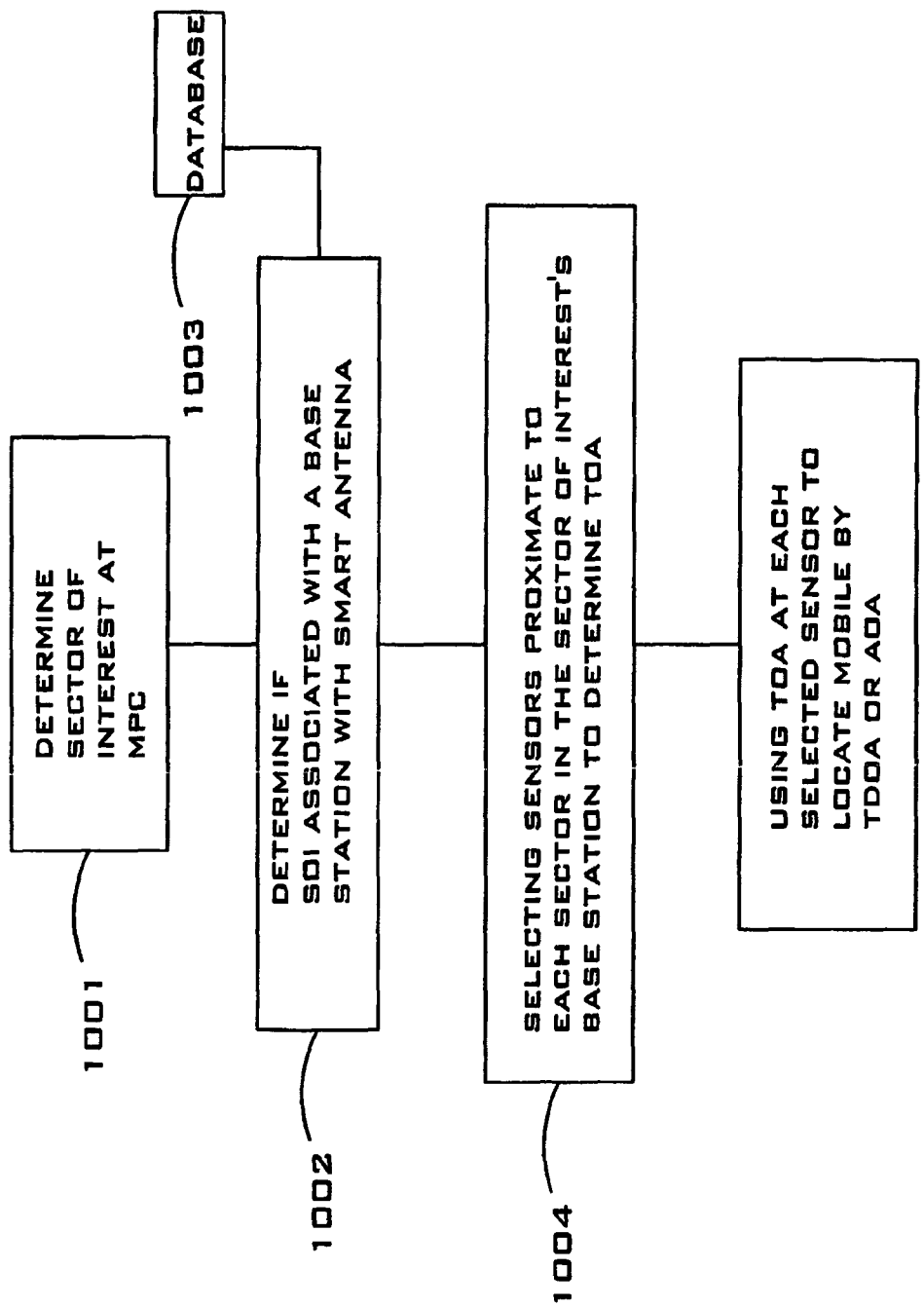
FIG. 10 is a flow chart of the operation of a geo-location system according to another embodiment of the disclosed subject matter.

FIG. 10 is a representative flow chart of an embodiment of the disclosed subject matter. As in the embodiment above, in block 1001 the MPC provides mobile information including a sector of interest for the targeted mobile appliance. At the geo-location system, the database or database field 1003 is accessed to determine whether the sector of interest's base station uses a smart antenna in block 1002. In block 1004, the geo-location system selects sector sensors proximate to all of the sectors associated with the sector of interest's base station. The geo-location system then uses the time of arrival at the selected sector sensors to determine the location of the mobile appliance using TDOA or AOA or other known methods.

Figure 11:
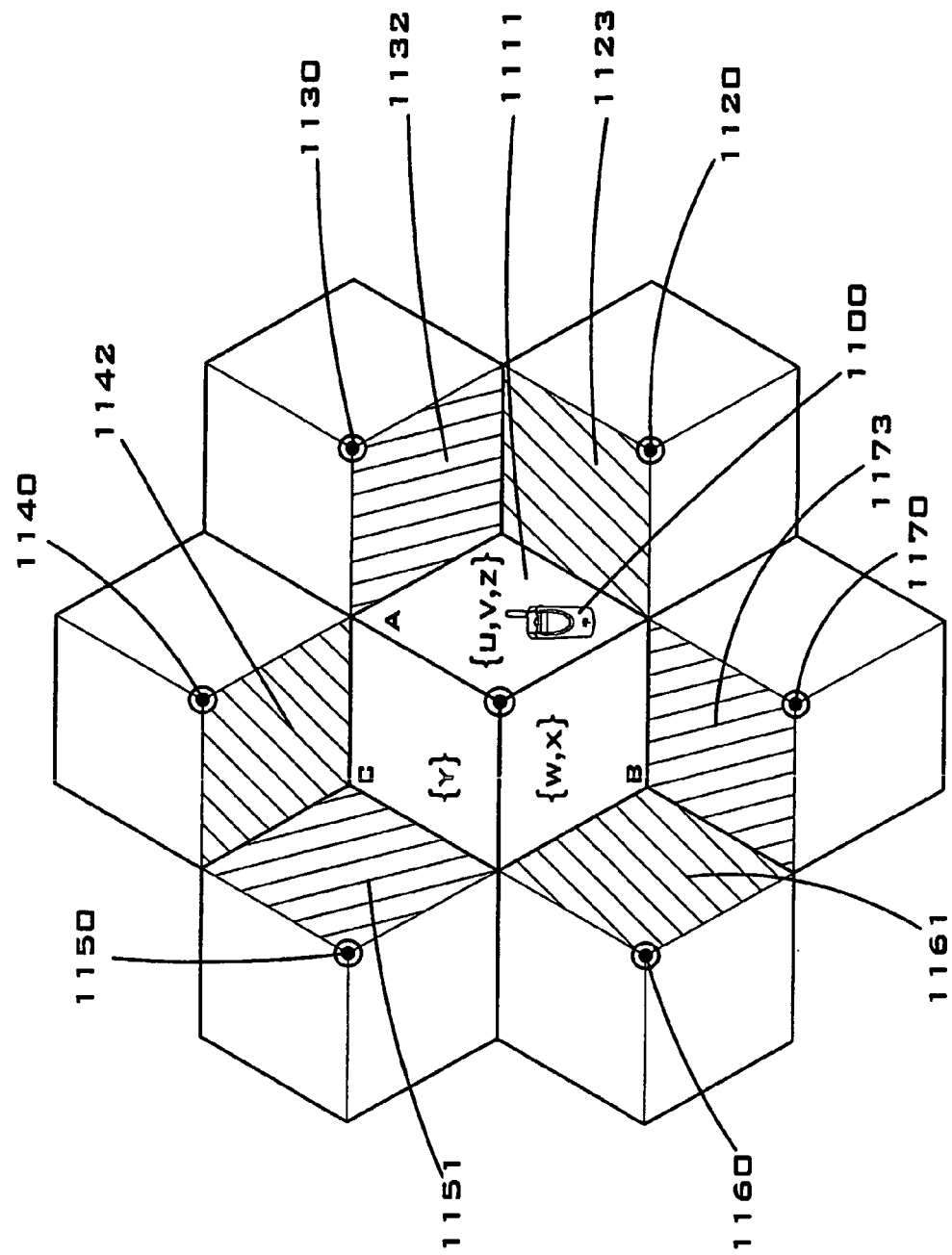
FIG. 11 is a representation of cells in a communication system locating a mobile appliance according to the embodiment of FIG. 10.

FIG. 11 shows the selection of sector sensors in neighboring base stations for the method shown in FIG. 10. FIG. 11 duplicates the smart antenna scenario described with respect to FIG. 5b and FIG. 9 previously. Using the embodiment of FIG. 10, the geo-location system upon identifying sector 1111 as the sector of interest for mobile appliance 1100 tasks all the sector sensors proximate to each sector (A, B and C) of the sector or interest's base station 1110 to locate the mobile appliances signal. As shown, sensors located in sectors 1123, 1132, 1142, 1151, 1161, and 1173 of base stations 1120, 1130, 1140, 1150, 1160 and 1170 respectively are used to locate the mobile stations. Without this type of tasking, resource utilization in a standard geo-location system could be excessive for a wireless communication system using smart antennas at the base stations. Further, such an approach allows improved location performance when the serving sector or sector of interest provided by the MPC is different from the actual sector.

Figure 12:
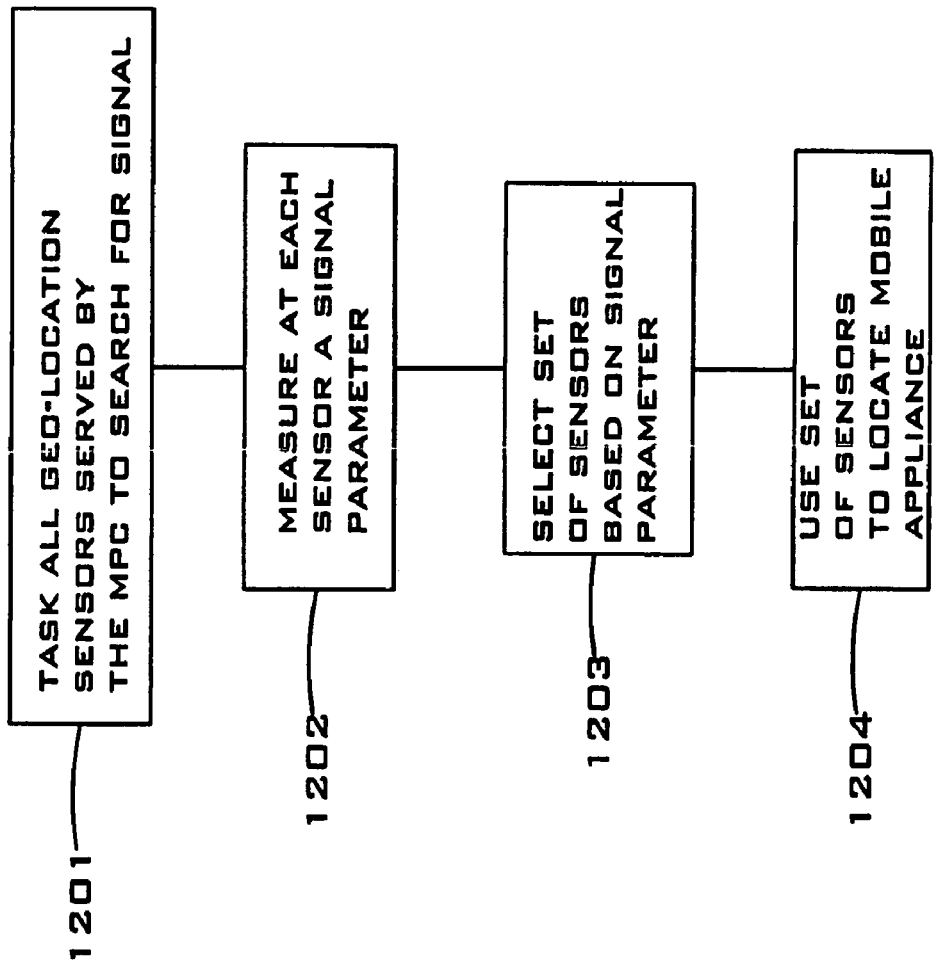
FIG. 12 is a flow chart of the operation of a geo-location system according to yet another embodiment of the disclosed subject matter.
Figure 13:
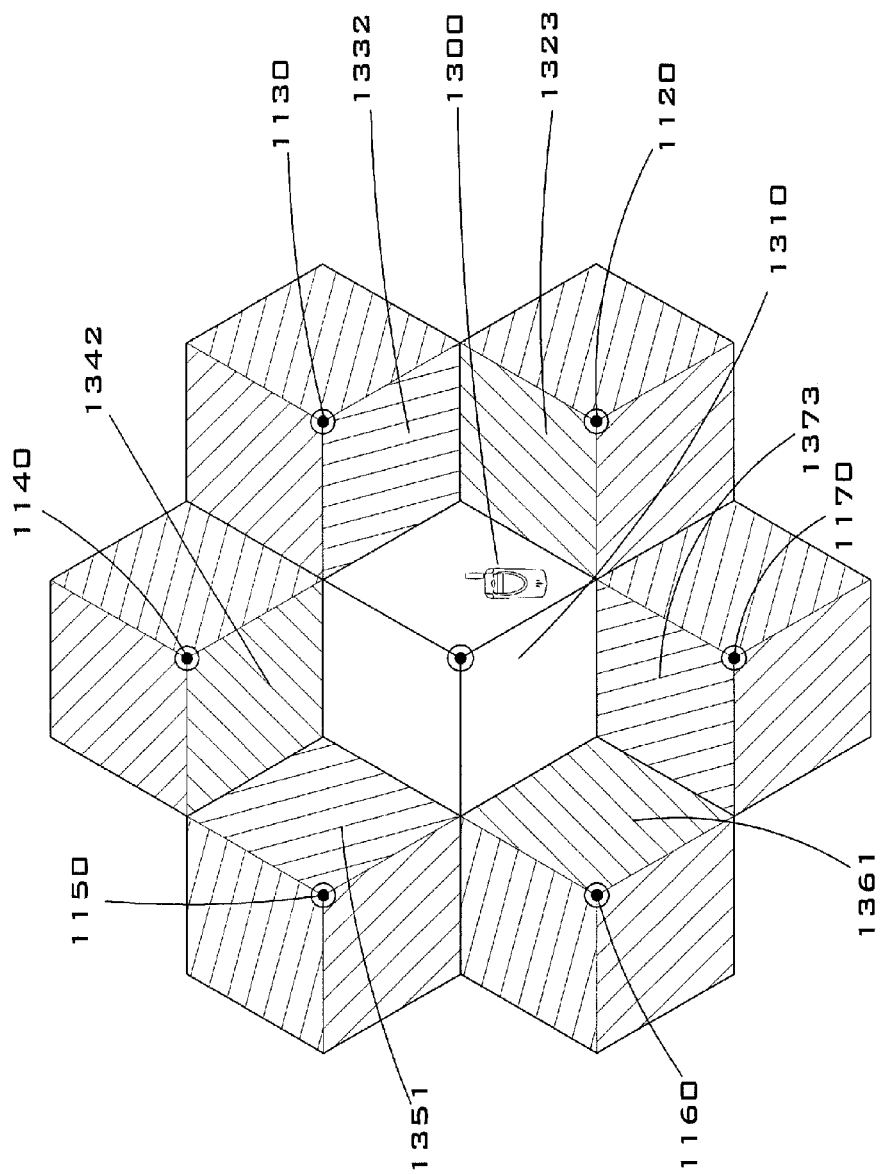
FIG. 13 is a representation of cells in a communication system locating a mobile appliance according to the embodiment of FIG. 12.

FIG. 12 is a flow chart of another embodiment of the disclosed subject manner. As shown in block 1201, the geo-location system tasks sensors at more than one base stations in the communication system to search for the mobiles signals. The tasked sensors measure received signal strength of the mobile signal, block 1202, and the geo-location system selects a set of the sensors in block 1203 to locate the mobile based on the measured received strength of the signal. In this manner, the actual sector of the mobile appliance is not needed. The sensors selected to locate the mobile are selected on the basis of their actual ability to receive the signal, therefore their vicinity is irrelevant. The geo-location system uses TDOA, and/or AOA of the signal at the selected sensors to locate the mobile in block 1204. FIG. 13 shows a representation of the operation of the location system for FIG. 12 in the scenario presented in FIG. 5b.

As shown in FIG. 13, each of the sectors 1323, 1332, 1342, 1351, 1361, 1373 searches for the signal. Sectors 1332, 1342, 1361 and 1373 received the signal at a sufficient high signal strength and thus are identified and participate in the determination of a location of the mobile 1300. Under other operations as shown in FIG. 9, sector 1323 would normally also be selected, however, because of other factors such as geography, or antenna height or localized interferers, the signal was not received with a high signal strength. Nonetheless, the geo-location system, since it does not rely on the sector information from the MPC, was able to locate the mobile 1300.

While preferred embodiments of the present inventive system and method have been described, it is to be understood that the embodiments described are illustrative only and that the scope of the embodiments of the present inventive system and method is to be defined solely by the appended claims when accorded a full range of equivalence, many variations and modifications naturally occurring to those of skill in the art from a perusal hereof.

What we claim is:

1. In a wireless communication system with a network overlay geo-location system, wherein the wireless system includes plural base stations and a Mobile Switching Center (MSC), each of said plural base stations including one or more pre-assigned sectors defining a coverage area of the respective base station and wherein one or more of the plural base stations include a smart antenna, a method for determining a location of a target mobile appliance comprising the steps of:
   determining a serving sector from the pre-assigned sectors in the MSC;
   determining from a database whether the serving sector's base station has a smart antenna;
   scanning antennas elements of the serving sector's base station, prior to pattern forming, for the target mobile appliance's signal to determine the actual sector serving the mobile appliance; and,
   tasking sensors in proximity of actual sector to locate the mobile appliance.

2. The method of claim 1, wherein the database comprises a field indicating if the serving sector is associated with a base station having a smart antenna.

3. The method of claim 1, wherein the target mobile appliance's signal is a reverse pilot signal.

4. The method of claim 1, wherein the step of scanning antenna elements comprises measuring a parameter of the mobile appliance's signal for the antenna elements.

5. The method of claim 4, wherein the parameter is selected form the group of received signal strength and a cross correlated quality metric.

6. The method of claim 1, wherein the actual sector is the same as the serving sector.

7. The method of claim 1, wherein the actual sector is not the same as the serving sector.

8. The method of claim 1, wherein the sensors proximate to the actual sector locate the mobile appliance using time-difference-of-arrival.

9. The method of claim 8, wherein the sensors proximate to the actual sector locate the mobile appliance using angle-of-arrival.

10. The method of claim 1, further comprising the steps of scanning antenna elements of base stations neighboring the serving sector's base station to determine the actual sector in which the mobile appliance is located.

11. In a network overlay geo-location system for wireless appliances operating in a host wireless communication system, wherein the host system includes a plurality of base stations including plural sectors defining a coverage area, wherein at least one base station employs a smart antenna, and a mobile switching center and a mobile positioning center, wherein the geo-location system uses information parameters from the mobile positioning center to assist in the location of wireless appliance, a method of determining the location of a target wireless appliance comprising the steps of:
   receiving a serving sector in the information parameters from the mobile positioning center;
   tasking sensors in proximity of each sector in the base station containing the serving sector to locate the mobile appliance, thereby determining the location of the target wireless appliance.

12. The method of claim 11, wherein the information parameters include Radio Frequency (RF) channel.

13. The method of claim 11, wherein the sensors in proximity to each sector locate the mobile appliance using time-difference-of-arrival.

14. The method of claim 13, wherein the sensors in proximity to each sector locate the mobile appliance using angle-of-arrival.

15. In a wireless communication system with a network overlay geo-location system, wherein the wireless system includes plural base stations, a Mobile Switching Center (MSC), and a Mobile Positioning Center (MPC), wherein each of the plural base stations have one or more assigned channels for each sector representing a coverage area, and wherein one or more of the plural base stations include smart antennas for adapting the sectors within the coverage area including reassignment of channels, a method of determining the location of a mobile appliance independently of sector information provided by the MPC Comprising the step of tasking all geo-location sensors in the geo-location system to search for the signal and selecting a set of sensors based on the mobile appliance's signal parameters at each sensor and locating the mobile appliance with the set of sensors.

16. The method of claim 15, wherein the mobile appliance's signal is a reverse pilot signal.

17. The method of claim 15, wherein the parameter is selected form the group of received signal strength and a cross correlated quality metric.

18. The method of claim 15, wherein the set of sensors locate the mobile appliance using time-difference-of-arrival.

19. The method of claim 15, wherein the set of sensors locate the mobile appliance using angle-of-arrival.

20. The method of claim 15, wherein the mobile appliances signal is a traffic signal.

21. A method of locating a mobile appliance operating in a wireless communication system with at least one base station employing a smart antenna, including the steps of receiving mobile information from the wireless communication system, said mobile information including information for determining a serving sector, and tasking geo-location sensors proximate to a search area to locate the mobile appliance, the improvement comprising the steps of:
for each antenna output associated with the serving sector's base station, measuring a parameter of the mobile appliance's signal; and,
selecting the search area based on the measured parameters, thereby improving the locating of the mobile appliance.

22. The method of claim 21, wherein the mobile appliance's signal is a reverse pilot signal.

23. The method of claim 21, wherein the parameter is selected form the group of received signal strength and a cross correlated quality metric.

24. The method of claim 21, wherein the sensors proximate to the search area locate the mobile appliance using time-difference-of-arrival.

25. The method of claim 21, wherein the sensors proximate to the search area locate the mobile appliance using angle-of-arrival.

26. The method of claim 21, wherein the mobile appliance's signal is a traffic signal.

27. In a network overlay location geo-location system for wireless appliances operating in a host wireless communication network, wherein the host network includes a plurality of base stations, wherein at least one base station employs a smart antenna, wherein the geo-location system uses wireless communication network information to assist in the location acquisition of wireless appliance, a method of determining the location of a target wireless appliance from the target wireless appliance's signal parameters measured at plural geo-location sensors comprising the steps of:
determining from a database which geo-location sensors are located at base stations with smart antennas;
adjusting the measured parameters from geo-location sensors located at base stations with smart antenna; and,
determining the location of the mobile appliance from the adjusted measured parameter.

28. The method of claim 27, wherein the target wireless appliance's signal is a reverse pilot signal.

29. The method of claim 27, wherein the parameter is time-or-arrival.

30. The method of claim 27, wherein the geo-location sensors locate the target wireless appliance using time-difference-of-arrival.

31. The method of claim 27, wherein the geo-location sensors locate the target wireless appliance using angle-of-arrival.

32. The method of claim 27, wherein the target wireless appliance's signal is a traffic signal.

33. The method of claim 27, wherein the adjustments to the measured parameters are time delay based.

34. A wireless communication system comprising:
plural base stations for communicating with one or more mobile units, wherein at least one of the plural base stations comprises a smart antenna; the smart antenna comprising an antenna array and a pattern-forming network;
a network overlay geo-location system comprising a plurality of sensors located at the plural base stations;
a mobile positioning center; wherein the mobile positioning center is in communicational connection with wireless network and the network overlay geo-location system;
wherein at least one of the plurality of sensors is interfaced between the antenna array and the pattern-forming network.

35. The system of claim 34, wherein the smart antenna further comprises a fixed beam former and the at least one plurality of sensors is connected at an interface between the antenna array and the fixed beam former.

36. The system of claim 34, wherein the smart antenna further comprises a fixed beam former and the at least one plurality of sensors is connected after the beam-forming network at an interface.

37. A network overlay geo-location system in a wireless communication system with a host base station having a smart antenna, wherein said smart antenna includes an antenna array and a pattern-forming network, the improvement comprising geo-location sensors connected between the antenna array and the pattern forming network.

38. In a wireless communication system with a network overlay geo-location system for locating a mobile appliance, wherein the wireless communication system includes plural base stations, and a Mobile Switching Center (MSC), a method for locating the mobile appliance comprising the steps of: retrieving serving sector information from wireless communication system, determining from a database if the serving sector is at a base station with a smart antenna and switching the network overlay geo-location system to a selected one of two different operating modes based on the determination.

39. The method of claim 38, wherein one of the two different operating modes comprises the steps of:
measuring the mobile appliance's signal's parameters at plural geo-locations sensors;
adjusting the measured parameters from geo-location sensors; and
determining the location of the mobile appliance from the adjusted measured parameters.

40. The method of claim 39, wherein the geo-location sensors locate the mobile appliance using time-difference-of-arrival.

41. The method of claim 39, wherein the geo-location sensors locate the mobile appliance using angle-of-arrival.

42. The method of claim 39, wherein the mobile appliance's signal is a traffic signal.

43. The method of claim 38, wherein one of the two different operating modes comprises the steps of:
for each antenna output associated with the serving sector's base station, measuring a parameter of the mobile appliance's signal;
selecting a geographic search area based on the measured parameters; and,
tasking a set of geo-location sensors proximate to the search area to locate the mobile appliance.

44. The method of claim 43, wherein the mobile appliance's signal is a reverse pilot signal.

45. The method of claim 43, wherein the parameter is selected form the group of received signal strength and a cross correlated quality metric.

46. The method of claim 43, wherein the set of sensors locate the mobile appliance using time-difference-of-arrival.

47. The method of claim 43, wherein the set of sensors locate the mobile appliance using angle-of-arrival.

48. The method of claim 43, wherein the mobile appliance's signal is a traffic signal.

49. The method of claim 38, wherein the wireless communication system includes a Mobile Positioning Center (MPC) and the serving sector information is retrieved from the MPC.

50. The method of claim 27, wherein the wireless communication network includes a Mobile Positioning Center (MPC) and the wireless communication network information is provided by the MPC.

51. The method of claim 21, wherein the wireless communication system includes a Mobile Positioning Center (MPC) and the mobile information is provided by the MPC.

* * * * *